US009107118B2

(12) United States Patent
Leelahakriengkrai et al.

(10) Patent No.: US 9,107,118 B2
(45) Date of Patent: Aug. 11, 2015

(54) METHOD FOR SIGNALING A MOBILE WIRELESS DEVICE TO SWITCH TO A PRESET CARRIER IN A MULTI-CARRIER 4G NETWORK

(75) Inventors: Rangsan Leelahakriengkrai, Streamwood, IL (US); Igor Filipovich, Chicago, IL (US); Rapeepat Ratasuk, Hoffman Estates, IL (US); Ivan N. Vukovic, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 466 days.

(21) Appl. No.: 12/908,933

(22) Filed: Oct. 21, 2010

(65) Prior Publication Data
US 2012/0099537 A1 Apr. 26, 2012

(51) Int. Cl.
*H04W 36/00* (2009.01)
(52) U.S. Cl.
CPC .................................. *H04W 36/0072* (2013.01)
(58) Field of Classification Search
USPC ........................................................ 370/329
See application file for complete search history.

(56) References Cited

U.S. PATENT DOCUMENTS

| | | | |
|---|---|---|---|
| 6,954,534 B2 | 10/2005 | Pace et al. | |
| 7,750,944 B2 * | 7/2010 | Arbogast | 348/211.7 |
| 7,957,351 B2 * | 6/2011 | Casaccia et al. | 370/334 |
| 2006/0128301 A1 | 6/2006 | Dorfstatter et al. | |
| 2006/0221894 A1 * | 10/2006 | Casaccia et al. | 370/328 |
| 2006/0244838 A1 * | 11/2006 | Arbogast | 348/211.4 |
| 2008/0247375 A1 * | 10/2008 | Muharemovic et al. | 370/344 |
| 2008/0316969 A1 * | 12/2008 | Prakash et al. | 370/331 |
| 2010/0034163 A1 * | 2/2010 | Damnjanovic et al. | 370/329 |

FOREIGN PATENT DOCUMENTS

WO WO 2011059373 A1 * 5/2011

* cited by examiner

*Primary Examiner* — Yemane Mesfin
*Assistant Examiner* — Jeff Banthrongsack
(74) *Attorney, Agent, or Firm* — Lerner, David, Littenberg, Krumholz & Mentlik, LLP

(57) ABSTRACT

A method, a system and an evolved nodeB (eNodeB) that enable user equipment (UE) to switch between carrier groups in a multi-carrier network. A carrier selection and switching (CSS) utility identifies a first and a second set of pre-configured groups of carrier frequencies that are subsequently assigned to a particular UE. The CSS utility notifies the UE of the assigned, pre-configured groups of carrier frequencies and provides the UE with system parameters associated with the first and second pre-configured groups of carrier frequencies. The CSS utility signals the UE to initiate communication via the first preconfigured group of carriers. Based on the occurrence of pre-established conditions, the CSS utility utilizes a switch signal to indicate via physical downlink control channel (PDCCH) to the UE (a) when to begin utilizing the second group of preconfigured carrier frequencies and (b) when to make subsequent switches between carrier groups.

23 Claims, 5 Drawing Sheets

METHOD FOR SIGNALING A MOBILE WIRELESS DEVICE TO SWITCH TO A PRESET CARRIER IN A MULTI-CARRIER 4G NETWORK

BACKGROUND

1. Technical Field

The present invention generally relates to wireless communication systems and in particular to multi-carrier frequency selection in wireless communication systems.

2. Description of the Related Art

As wireless networks evolve, there is a constant need to provide continuous and faster access to data networks. Therefore, in order to meet the need for continuous and faster access to data networks, wireless communication systems may use multiple carriers for the transmission and/or reception of data. A wireless communication system that uses multiple carriers for the transmission and/or reception of data may be referred to as a multi-carrier system.

A multi-carrier system may increase the bandwidth available in a wireless communication system according to how many carriers are made available. For example, a dual carrier system may double the bandwidth when compared to a single carrier system and a tri-carrier system may triple the bandwidth when compared to a single carrier system, etc. This may improve the quality of service (QoS) for end users.

In 3rd Generation Partnership Project (3GPP), Long term evolution (LTE) Advanced, utilized for cellular 3G services, communications occur over multiple carriers. LTE technology is based on a 3GPP standard that provides for a downlink speed of up to 100 megabits per second (Mbps) and an uplink speed of up to 50 Mbps. With multiple antennas, speeds can reach more than 320 Mbps on the downlink. However, current LTE standards utilize a handover procedure to switch between carriers on a multi-carrier system. While the handover procedure within LTE is intended to minimize interruption time to less than that of circuit-switched handovers in 2G networks, the handover procedure for LTE remains time consuming due to the number of operations involved within the steps of handover preparation, execution, and completion.

BRIEF DESCRIPTION OF THE DRAWINGS

The described embodiments will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
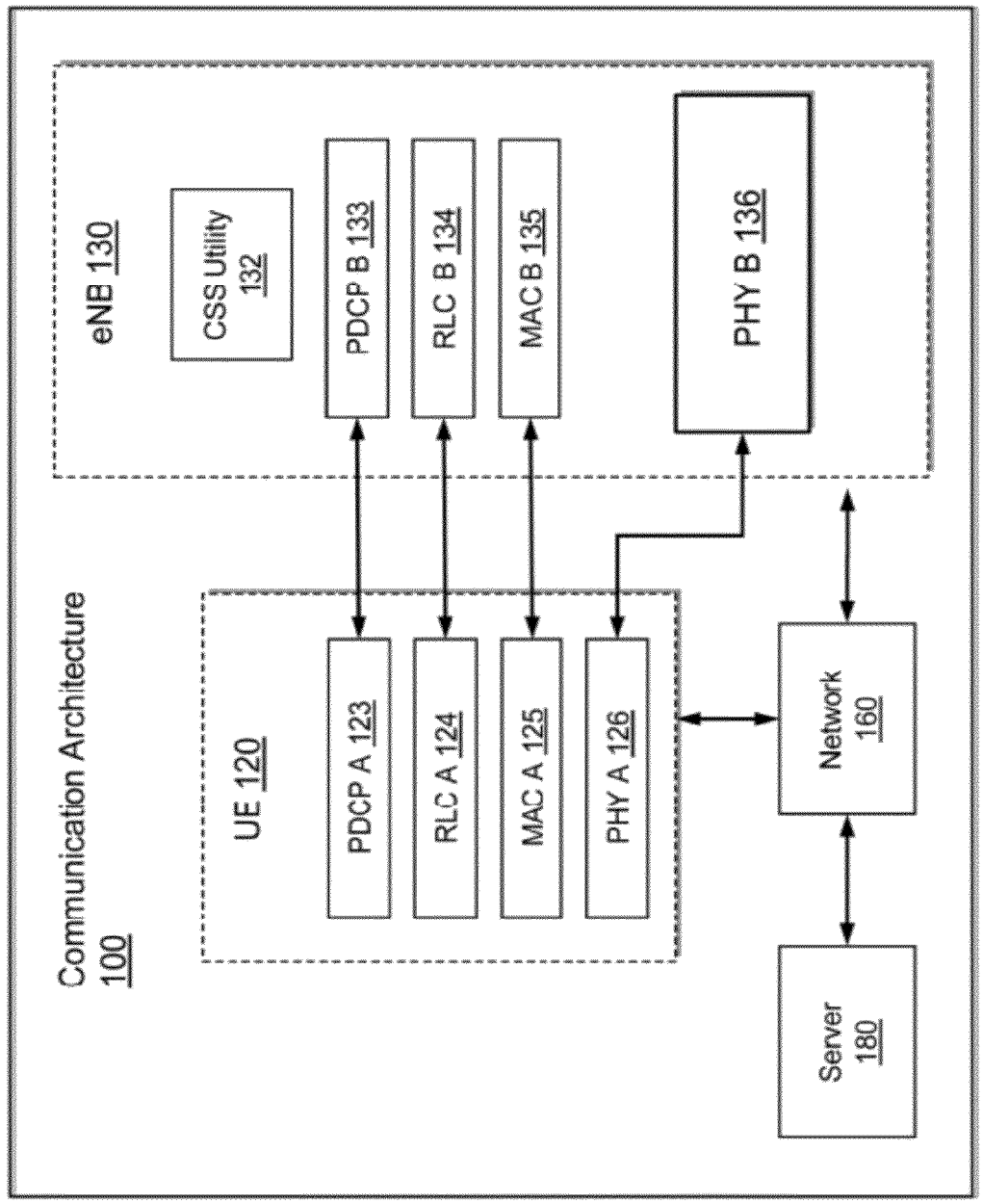
FIG. 1 provides a block diagram representation of radio protocol architecture for communication between user equipment (UE) and Evolved Universal Terrestrial Radio Access Network Node B (eNB) within which the invention is practiced, according to one embodiment of the invention.

The illustrative embodiments provide a method, a system and an evolved nodeB (eNodeB) for enabling user equipment (UE) to switch between carrier groups in a multi-carrier network. A carrier selection and switching (CSS) utility identifies a first and a second set of pre-configured groups of carrier frequencies that are subsequently assigned to a particular UE. The CSS utility notifies the UE of the assigned, pre-configured groups of carrier frequencies and provides the UE with system parameters associated with the first and second preconfigured groups of carrier frequencies. The CSS utility signals the UE to initiate communication via the first preconfigured group of carriers. Based on the occurrence of pre-established conditions, the CSS utility utilizes a switch signal to indicate via physical downlink control channel (PDCCH) to the UE (a) when to begin utilizing the second group of preconfigured carrier frequencies and (b) when to make subsequent switches between carrier groups.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of communication architecture for communication between user equipment (UE) and Evolved Universal Terrestrial Radio Access Network Node B (eNB). As illustrated, within communication architecture 100 is UE 120 and eNB 130. UE may be a computer, a portable device, such as a personal digital assistant (PDA), a smart phone, and/or other types of electronic devices that provide mobile communication and data transmission. UE 120 comprises packet data convergence protocol (PDCP) A 123, radio link control (RLC) A 124, medium access control (MAC) A 125, and physical layer (PHY) A 126. In communication with UE 120 is eNB 130. Comprised within eNB 130 are: carrier selection and switching (CSS) utility 132, packet data convergence protocol (PDCP) B 133, radio link control (RLC) B 134, medium access control (MAC) B 135, and physical layer (PHY) B 136. Additionally, communication architecture 100 includes network 160 and server 180.

In one embodiment, eNB 130 transmits and receives data and/or information from UE 120. PDCP A 123, RLC A 124, MAC A 125, and PHY A 126 of UE 120 enable UE 120 to communicate (e.g., configuration data) via respective connections/layers with eNB 130 that similarly comprises PDCP B 133, RLC B 134, MAC B 135, and PHY B 136. Network 160 also receives and transmits data to and from UE 120 and eNB 130. Network 160 may send and receive data/information from one or more components (not shown) via server 180. Server 180 may be or may include a software deploying server, and eNB 130 communicates with the software deploying server (180) via network 160.

Figure 2:
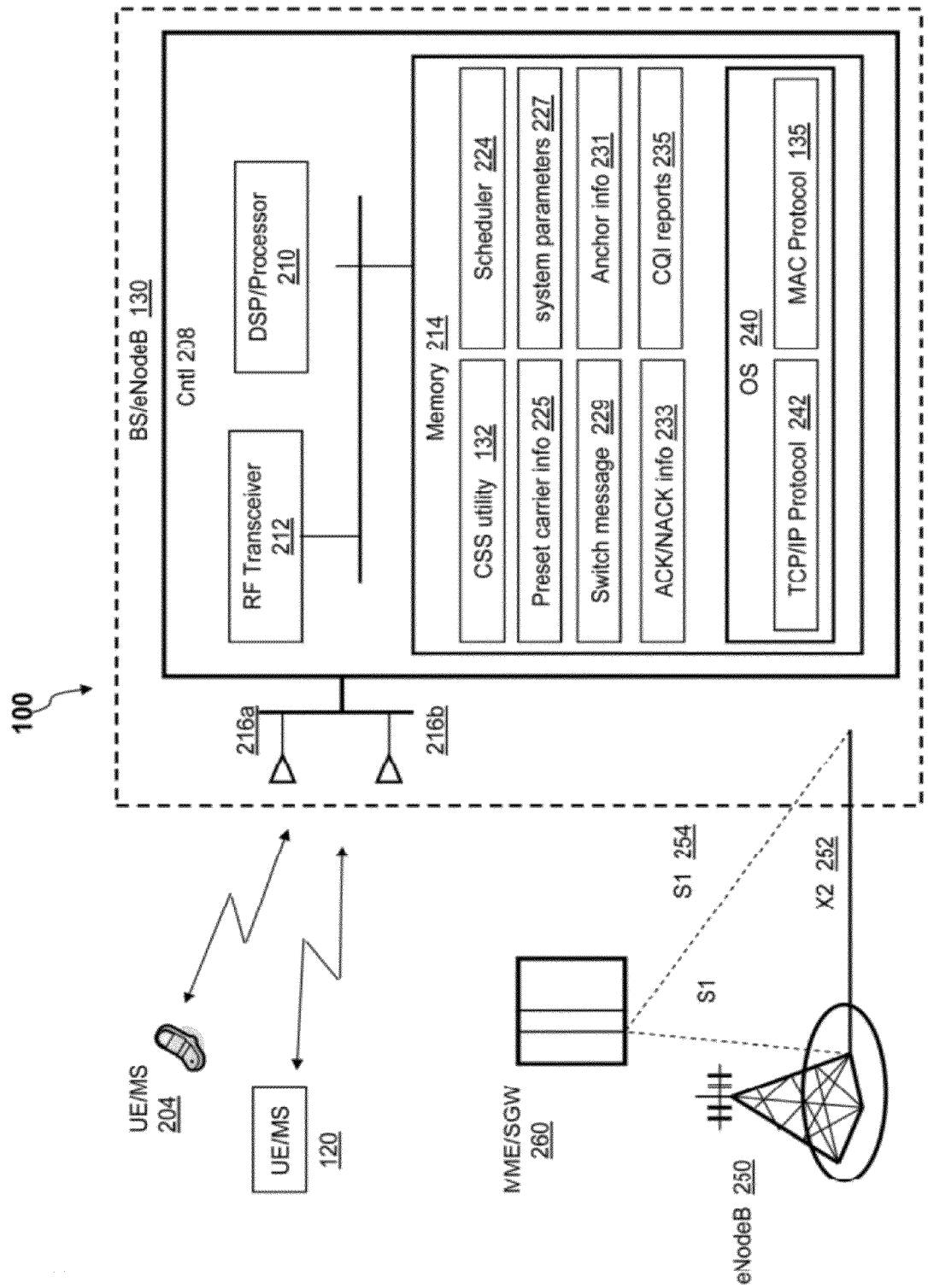
FIG. 2 provides a block diagram representation of a Long Term Evolution (LTE) configured wireless communication system having an Evolved Node B (eNodeB), within which the invention is practiced, according to one embodiment.

With reference now to FIG. 2, there is depicted a block diagram representation of a base-station (BS)/eNodeB (eNB) 130 within a wireless communication system (WCS) 100, which operates as an LTE system, according to one embodiment. In one embodiment, eNB 130 may represent a base transceiver station (BTS), an enhanced/evolved node B (enodeB/eNB) or a base station. In the described embodiments, wireless communication system 100 may support several standards/networks, such as third generation (3G) and fourth generation (4G) networks, which include Long Term Evolution (LTE) standard.

Wireless communication system 100 comprises a number ("L") of wireless communication devices, for example, first and second wireless devices, mobile station (MS) 120 and MS 204. One or more of the wireless communication devices may be associated with a mobile user/subscriber. Thus, in certain instances, a wireless communication device may be interchangeably referred to herein as a user device, user equipment (UE), "mobile", mobile user device, mobile station (MS), subscriber or user (as a general reference to the association of the device(s) to a device user). These references are however not intended to be limiting on the applicability of the invention to devices not directly associated with individual/human users. UE/MS 120 and UE/MS 204 wirelessly communicate with eNB 130 via the antenna array that includes eNB antenna 216a and 216b. Base station/eNB 130 may also be interchangeably referred to herein as an eNodeB. Also included in wireless communication system 100 is second BS/eNodeB 250. BS/eNB 130 and second BS/eNB 250 are interconnected by means of an X2 interface (e.g., X2 252). Furthermore, BS/eNB 130 and second BS/eNB 250 are connected by means of an S1 interface (e.g., S1 254) to an evolved packet core (EPC), and more specifically, to mobility management entity (MME)/serving gateway (S-GW) 260. UE/MS 120 and BS/eNB 130 comprises BS controller 208. Controller 208 comprises memory 214, digital signal processor (DSP)/Processor 210 and radio frequency (RF) transceiver 212. Although the logic of RF transceiver 212 is illustrated within controller 208, it should be appreciated that with other implementations, RF transceiver 212 may likely be positioned external to controller 208. Also, while shown as a single module/device, DSP/Processor 210 may be one or more individual processing/control components communicatively coupled to each other, and controlling different functions within Controller 208.

In addition to the above described hardware components of BS/eNB 130 within wireless communication system 100, various features of the invention may be completed/supported via software (or firmware) code or logic stored within memory 214 (or other storage) and executed by DSP/Processor 210. Thus, for example, illustrated within memory 214 are a number of software/firmware/logic/data components (or modules), including operating system (OS) 240, which includes Transmission Control Protocol (TCP)/Internet Protocol (IP) module 242 and Media Access Control (MAC) protocol module 135. Memory 214 also includes scheduler 224, preconfigured carrier (groups) information 225, carrier system parameters 227, switch message 229 and Anchor Carrier information 231. The BS/eNodeB 130 assigns one or multiple Anchor carriers to each UE/MS 120. The UE/MS 120 uses this carrier as the starting point to receive the command from BS/eNodeB 130 to add more non-anchor carriers. The UE/MS 120 can be configured by the BS/eNodeB 130 to only receive PDCCH from this Anchor carrier that contains PDSCH resource allocation information in the Anchor carrier and/or other non-anchor carriers. The BS/eNodeB 130 can also configure the UE/MS 120 to receive PDCCH from all of its assigned carriers. BS/eNB 130, via scheduler 224, schedules downlink communication of data between BS/eNB 130 and UE/MS 120. Also included within memory 214 are ACK/NACK information 233 and channel quality indicator (CQI) reports 235. In addition, memory 214 comprises carrier selection and switching (CSS) logic/utility 132. In one embodiment, CSS utility 132, within eNB 130, may be combined with or incorporated within one or more applications to provide a single executable component. Thus, in some implementations CSS logic 132 may be combined with scheduler 224 as well as with one or more of the other components/modules to provide a single executable component, collectively providing the various functions of each individual component when the corresponding combined utility is executed by processing components of eNB 130. For simplicity, CSS utility 132 is illustrated and described as a stand-alone or separate software/firmware component, which provides specific functions, as described below. In the described embodiment, CSS utility 132 provides certain functions that are executed by components within communication architecture 100, specifically UE 120 and eNB 130. For simplicity of the description, the collective body of code that enables these various features is referred to herein as CSS utility 132.

In one embodiment, CSS utility 132 may be deployed from/on the network, via server 180 (FIG. 1). With this configuration, the software deploying server performs one or more functions associated with the execution of CSS utility 132. Accordingly, eNB 130 is not required to utilize internal resources of eNB 130 or communication architecture 100 to execute CSS utility 132.

Among the software code/instructions/logic provided by CSS utility 132, and which are specific to the invention, are: (a) code/logic for providing information to a UE that dynamically identifies one or more pre-configured groups of carriers for communication with the UE; (b) code/logic for transmitting system parameters corresponding to one or more of the predetermined group of carriers to the UE prior to the transmission of a switch message request; and (c) code/logic for initiating switching of a first carrier group to a second carrier group. According to the illustrative embodiment, when BS/eNB 130 executes CSS utility 132, a series of functional processes that enable the above functional features as well as additional features/functionality are implemented. These features/functionality are described in greater detail below within the description of FIGS. 3-5.

Those of ordinary skill in the art will appreciate that the hardware components and basic configuration depicted in FIG. 1 and FIG. 2 may vary. The illustrative components within wireless communication system/architecture 100 and BS/eNB 130 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Figure 3:
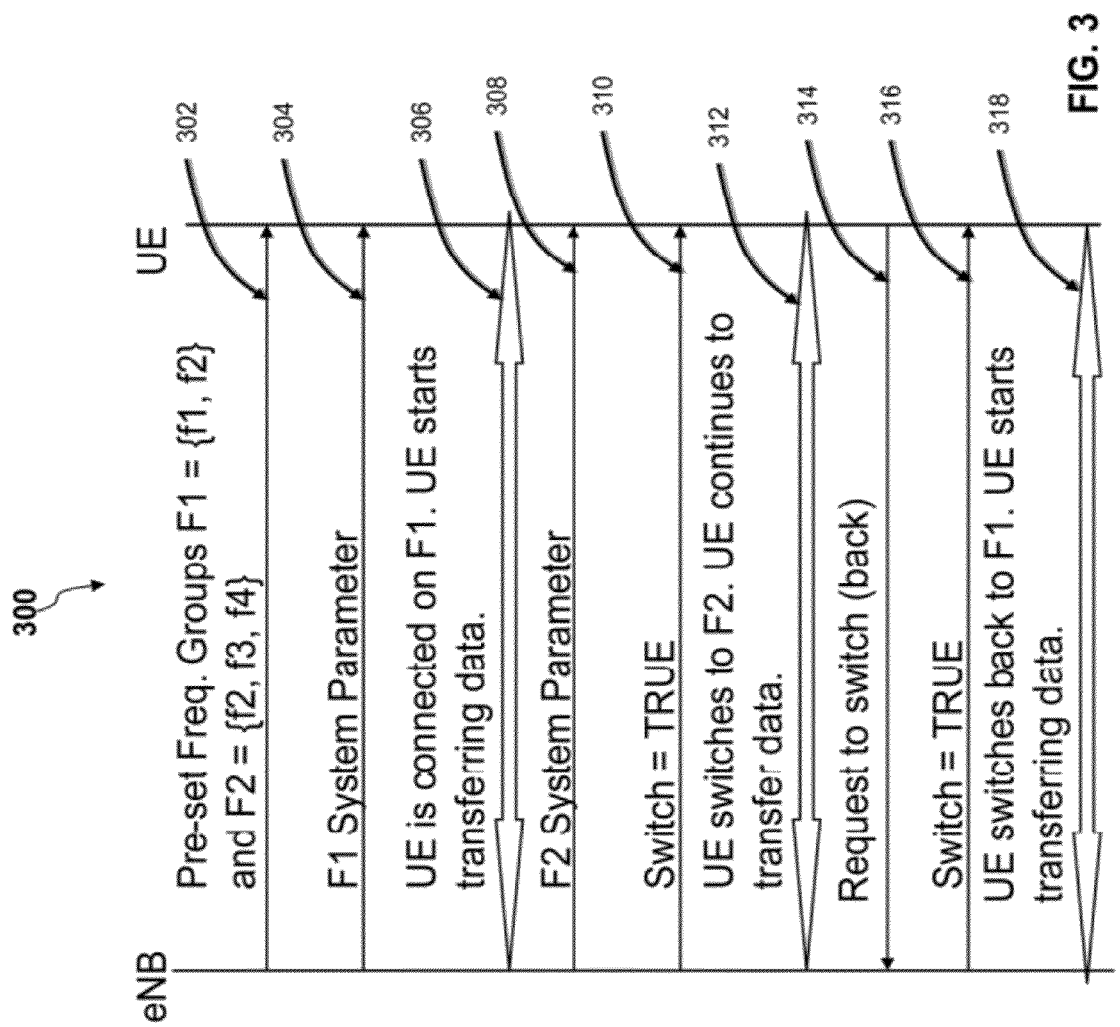
FIG. 3 illustrates a message flow sequence between an eNodeB and a UE in a multicarrier network, according to one embodiment.

With reference now to FIG. 3, a message flow sequence between an eNodeB and a UE in a multicarrier network is illustrated, according to one embodiment. Multicarrier network 300 includes eNB 130 and UE 120 that collectively provide a sequence of message signals to enable UE 120 to communicate via multiple carrier groups. In multicarrier network 300, CSS utility 132 signals the assignment of resources to UE 120 by transmitting (initial) information/message signal 302 to UE 120. In particular, CSS utility 132 transmits information signal 302 to indicate the assignment of predetermined groups of carriers to UE 120.

In one embodiment, CSS utility 132 dynamically identifies (e.g., based on transmission conditions) groups of carriers that are utilized for downlink transmission from eNB 130 to UE 120. CSS utility 132 pre-establishes these groups of carriers and notifies the UE of these assigned carriers by sending information via message signal 302 about the preconfigured groups of carriers, which information indicates the particular carrier groups that UE 120 may utilize. CSS utility 132 also indicates the carrier group that UE 120 is allowed to utilize for an initial communication period. Carrier group F1 and carrier group F2 are predetermined groups of carrier frequencies to which UE 120 is assigned via message signal 302. One or more frequencies may exist within carrier group F1 and carrier group F2. For example carrier group F1 may include {f1, f2}, where 'f' is a frequency within the group of carrier frequencies. Carrier group F2 may provide different and/or overlapping frequencies than carrier F1, for example, F2={f2, f3, f4}. Carrier frequency f2 is common among these two carrier groups, F1 and F2. In one embodiment, CSS utility 132 may connect to one preconfigured carrier group to monitor/listen to a single carrier or carrier group to enable efficient processing and to save battery life.

With message signal 304, CSS utility 132 provides system parameters for the first carrier group "F1". In another embodiment, the signal providing information about the preconfigured group of carriers may also provide the system parameters of one or more of the predetermined groups of carriers (carrier group F1 and carrier group F2). The system parameters of the predetermined group of carriers may include, but are not limited to specifications to enable synchronization in the time and frequency domains at a wireless device receiver.

CSS utility 132 detects that communication via the first carrier group "F1" is initiated via procedure 306. As part of procedure 306, CSS utility 132 may (a) utilize a first message signal to provide confirmation that UE 120 is connected on F1 and (b) await detection of the transfer of data by UE 120 via F1. CSS utility 132 provides via message signal 308, system parameters for the second carrier group "F2". CSS utility 132/eNodeB 130 triggers a switch to the second carrier group by sending switch message 310 to UE 120 in the form of a PDCCH order or higher layer messaging. A switch message is transmitted to UE 120 to initiate switching of a first carrier group to a second carrier group, from among the predetermined group of carriers (i.e. carrier group F1 and carrier group F2). The PDCCH order that is transmitted depends on the identification of the carrier group that is currently active. For example, if carrier group F1 is the current/active carrier group, then a switch signal is transmitted to UE 120 to initiate the switch and to indicate the destination carrier group. Responsive to transmitting the switch message from eNB 130 via the respective PDCCH to UE 120, an acknowledgment is received by eNB 130 from UE 120. The acknowledgment verifies that a switch by UE 120 from the first carrier (e.g., carrier group F1) to the second carrier group (e.g., carrier group F2) is complete.

In another embodiment, eNB 130 dynamically determines when to initiate a switch from the first carrier to the second carrier. In one embodiment, the switch message utilizes a particular downlink control information (DCI) format. The switch message provides a preconfigured pattern that conveys to UE 120 that the transmitted signal is a message to initiate switching to a new carrier. When there is more than one carrier group available, the message to switch specifies the target carrier group, for example, via the number of bits in a segment of the message. Initiation of a switch from a first carrier to a second carrier may occur for several reasons that include but are not limited to the following: (a) when one or more carriers require designation to a common group of UEs (e.g. emergency and/or non-emergency UEs); (b) eNB requires load balancing (e.g. balancing PDCCH loads); (c) a request by UE 120 to "listen to" (or operate on) one or more particular frequencies; and (d) when a particular carrier provides UE 120 with less battery consumption. In another embodiment, as an alternative to transmission as a PDCCH order, the message (or signal), to initiate switching can be completed by a higher-layer signal. The higher layer signal may be transmitted as a common message to a predefined group of UEs (UE 120) to provide overhead savings. CSS utility 132 may define a custom/new radio network temporary identifier (RNTI) to support the ability of UEs to listen for this type of common message). In one embodiment, CSS utility 132 defines an enhanced ACK/NACK procedure to provide broadcast ACK/NACK feedback.

Following completion of the switch of carriers/carrier groups, CSS utility 132 detects via procedure 312 that communication via the second carrier group "F2" is initiated. At a subsequent interval, UE 120 sends message 314 to eNodeB 130 to request a switch back to communication via the first carrier group "F1". In response to receipt of the request for a switch from UE 120, CSS utility 132 transmits switch message 316 to enable the switch to communication via "F1". Following the switch back to carrier group F1 triggered by the request from UE 120, CSS utility 132 detects via procedure 318 that communication via the first carrier group "F1" is initiated.

Figure 4:
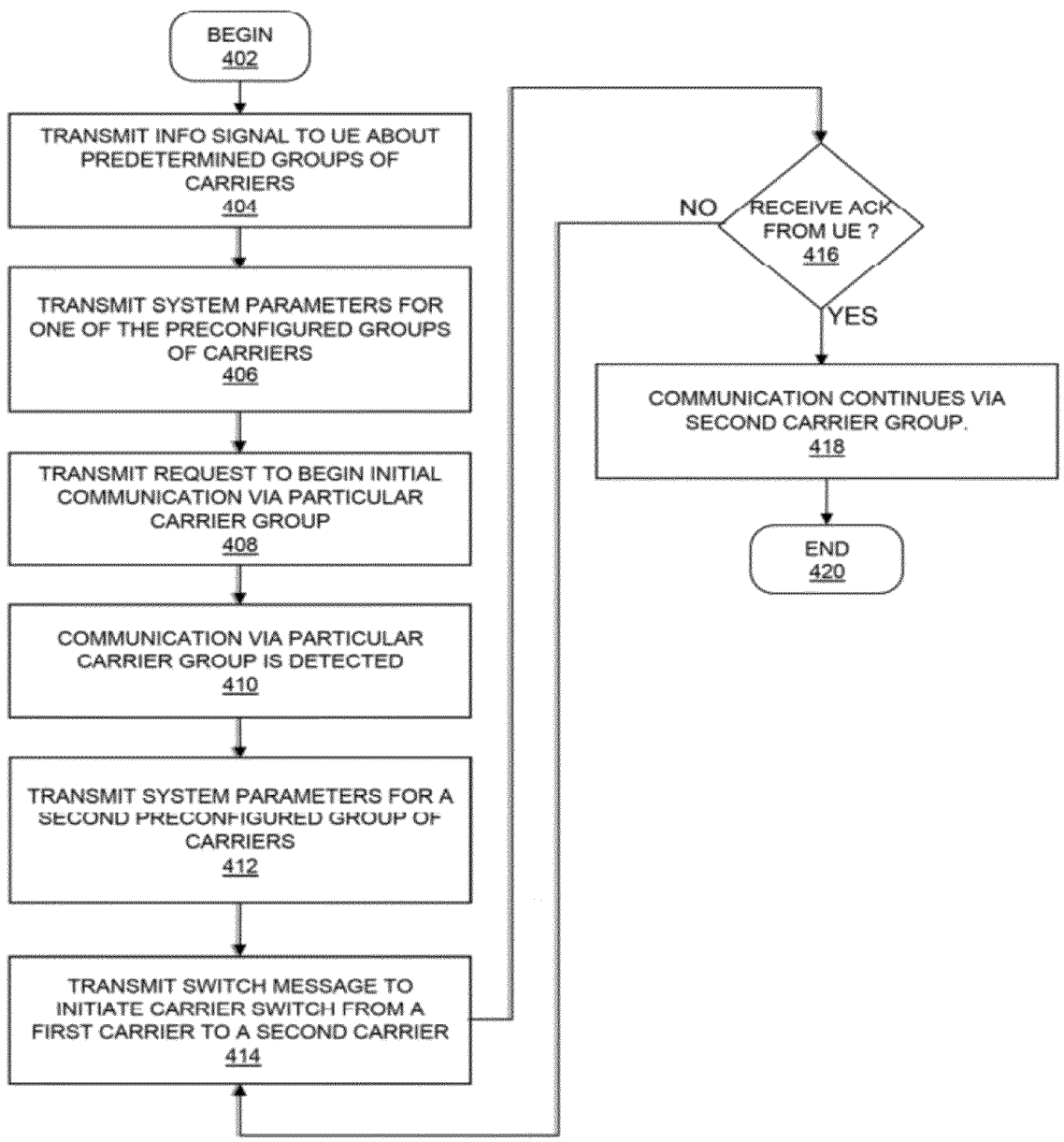
FIG. 4 is a flow chart illustrating the method by which eNB signals the UE to switch to a predetermined carrier, according to one embodiment of the invention.
Figure 5:
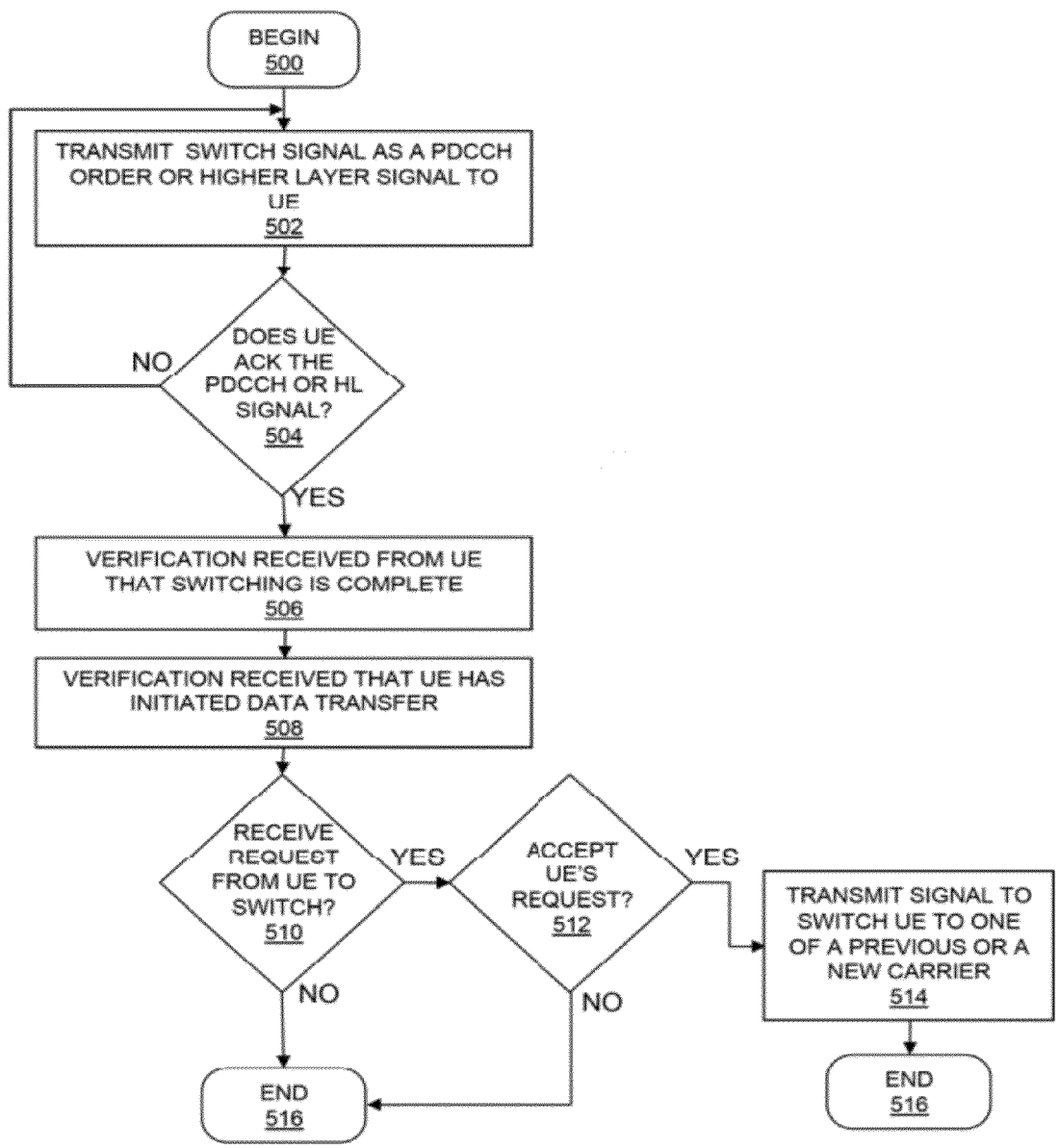
FIG. 5 is a flow chart illustrating the method by which the UE receives and sends a request to switch to a carrier, according to one embodiment of the invention.

FIGS. 4-5 are flow charts illustrating various methods by which the above processes of the illustrative embodiments are completed. Although the methods illustrated in FIGS. 4-5 may be described with reference to components shown in FIGS. 1-3, it should be understood that this is merely for convenience and alternative components and/or configurations thereof can be employed when implementing the various methods. Key portions of the methods may be completed by CSS utility 132, executing within eNB 130 of wireless communication system/architecture 100 (of FIGS. 1 and 2) and controlling specific operations of wireless communication system/architecture 100 or eNB 130, and the methods are thus described from the perspective of both CSS utility 132 and eNB 130.

FIG. 4 describes the process by which eNB 130 signals the UE 120 to switch to a predetermined carrier. The process of FIG. 4 begins at initiator block 402 and proceeds to block 404, at which CSS utility 132 transmits an information signal to UE 120. The signal provides information about the assigned, pre-determined carrier groups. At block 406, CSS utility 132 transmits a first complete set of system parameters corresponding to one of the predetermined carrier groups to UE 120.

At block 408, CSS utility 132 transmits to UE 120 a request for UE 120 to begin initial communication (i.e., communication during an initial/first communication period) via the particular/first preconfigured carrier group for which system parameters are provided. CSS utility 132 detects that communication via the first carrier is initiated, as shown at block 410. At block 412, CSS utility 132 transmits a second set of system parameters corresponding to a second predetermined carrier group to UE 120. At block 414, CSS utility 132 transmits to UE 120 a request for UE 120 to switch to communication via the second carrier group for which the second set of system parameters have been provided. For example, CSS utility 132 may transmits a "switch=true" message to the UE. In one embodiment, CSS utility 132 includes within the request a preconfigured pattern to indicate that this particular request message is a switching message (e.g., as opposed to an actual downlink data grant). CSS utility 132 provides in the switch request message one or more of: (a) indication for UE to switch into a preconfigured group; and (b) a bitmap to identify selected destination group of carriers. In another embodiment, CSS utility 132 is able to provide UE 120 with the ability to switch between carrier frequency groups "F1" and "F2" which are associated respectively with a first communication service via a first standard (e.g., LTE) and a second communication service via a second standard (e.g., WIFI). A decision is made, at decision block 416, whether the UE has provided acknowledgment (ACK) that the switch has taken place. When acknowledgement is not received from UE, the process returns to block 414. When acknowledgment is received from the UE, the process continues to block 418. At block 418, CSS utility 132 receives verification that UE is transferring data, with respect to the carrier switch. The process ends at block 420.

FIG. 5 describes the process by which the UE receives and sends a request to switch to a particular carrier. The process begins at initiator block 500 and proceeds to block 502, at which CSS utility 132 transmits a switch signal to the UE 120 as a PDCCH order or higher layer signal. CSS utility 132 determines, at block 504, whether UE acknowledges receipt of the PDCCH order or higher layer (HL) signal. When UE does not acknowledge receipt of the PDCCH or higher layer signal, the process returns to block 502. When UE does acknowledge receipt of the PDCCH or higher layer signal, the process continues to block 506. CSS utility 132 receives verification from the UE, at block 506, that switching is complete. At block 508, CSS utility 132 receives verification that UE 120 has initiated data transfer following the carrier switch. At block 510, CSS utility 132 determines whether a request to switch to a second (or different) carrier (or group of carriers) is received. In one embodiment, CSS utility 132 receives from UE 120 a request to switch to a particular preconfigured group of carrier frequencies based on one or more of: (a) indications that the particular pre-configured group of carrier frequencies is able to achieve better SINR performance in current transmission conditions; and (b) lower cost of service via the particular pre-configured group of carrier frequencies. When the request (from the UE) to switch to a second carrier is not received (i.e., UE 120 does not request a carrier switch), the process ends. When the request (from the UE) to switch to a second carrier is received, the process continues to block 512. CSS utility 132 determines, at block 512, whether to accept the UE's request to switch to a second carrier. When the request from UE 120 to switch to a second carrier is not accepted, the process ends. When the request from UE 120 to switch to a second carrier is accepted, the process continues to block 514. At block 514, CSS utility 132 transmits a signal to UE 120 to instruct UE 120 to switch to a second carrier. In one embodiment, the second carrier is a previous carrier or a new carrier. The process ends at block 516.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As presented by the described and illustrated embodiments, in a wireless communication system, CSS utility 132/eNodeB 130 provides a method and a base-station (e.g., eNodeB) that enables a wireless device to switch between carriers on a multi-carrier network by performing the following functions: dynamically identifying multiple preconfigured groups of carrier frequencies for downlink communication with the wireless device; sending, to the wireless device, an information signal that specifies a first pre-configured group of carrier frequencies and an alternative, second pre-configured group of carrier frequencies, wherein the first and second preconfigured groups of carrier frequencies are included within the multiple preconfigured groups of carrier frequencies identified; transmitting substantially complete sets of system parameters associated with the first pre-configured group of carrier frequencies and the second pre-configured group of carrier frequencies to the wireless device; and sending a request message to the wireless device to instruct the wireless device to communicate via the first pre-configured group of carrier frequencies during a first communication period.

The method and base station further perform the following functions: dynamically determining when to trigger a switch from the first preconfigured carrier group to the second preconfigured carrier group; in response to a determination that an optimal period to trigger the switch is a current period, transmitting a switch message to request the switch; obtaining acknowledgement information that indicates whether the wireless device completed the switch according to the switch message; following the switch, receiving verification that the wireless device is receiving data via the second preconfigured group of carrier frequencies; receiving from the wireless device a request to switch to a particular preconfigured group of carrier frequencies; and responding to the request from the wireless device to switch to the particular preconfigured group of carrier frequencies.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless communication system having an evolved nodeB (eNodeB), a method for enabling a wireless device to switch between carriers on a multi-carrier network, the method comprising:
dynamically identifying a plurality of preconfigured groups of carrier frequencies for downlink communication with the wireless device;
sending, to the wireless device, at least one information signal that specifies a first pre-configured group of carrier frequencies and an alternative, second pre-configured group of carrier frequencies from among the plurality of preconfigured groups of carrier frequencies identified;
sending a request message to the wireless device to instruct the wireless device to communicate via the first pre-configured group of carrier frequencies during a first communication period;
dynamically determining whether or not to trigger a switch from the first preconfigured group of carrier frequencies to the second preconfigured group of carrier frequencies, wherein triggering a switch from the first preconfigured group of carrier frequencies to the second pre-configured group of carrier frequencies occurs when one of the following occurs: (1) one or more carrier frequencies require designation to a common group of wireless devices, (2) the wireless device generates a request to listen to or operate on one or more particular carrier frequencies, (3) a particular carrier frequency provides the wireless device with less battery consumption, and (4) the second pre-configured group of carrier frequencies provides lower cost of service than the first pre-configured group of carrier frequencies; and
in response to determining to trigger said switch, transmitting a switch message to request said wireless device to perform the switch.

2. The method of claim 1, further comprising:
obtaining acknowledgement information from the wireless device indicating that the wireless device has completed the switch according to said switch message; and
receiving verification that said wireless device is receiving data via said second preconfigured group of carrier frequencies.

3. The method of claim 1, further comprising:
providing instructions to said wireless device to restrict said wireless device from communicating via said second pre-configured group of carrier frequencies until said eNodeB transmits the signal to the wireless device to request the switch to said second pre-configured group of carrier frequencies.

4. The method of claim 1, further comprising:
transmitting to said wireless device a first set of system parameters corresponding to said first preconfigured group of carrier frequencies prior to the request to initiate communication in said initial communication period via said first preconfigured group;
transmitting a second set of system parameters following connection of said wireless device with said eNodeB via said first pre-configured group of carrier frequencies.

5. The method of claim 4, wherein the first set of system parameters associated with said first pre-configured group is transmitted at a period that is defined by one of: (a) a higher priority, first period that is prior to transmission of said second set of system parameters; and (b) a lower priority, second period that is substantially at a same time as a transmission of said second set of system parameters.

6. The method of claim 1, further comprising:
sending an appropriate set of system parameters to the wireless device at a period prior to transmission of a request to switch to a corresponding preconfigured group of carrier frequencies, wherein said appropriate set of system parameters are provided prior to the switch to minimize delays in subsequent switching of carrier frequencies.

7. The method of claim 1, further comprising assigning one or more anchor carriers to the wireless device.

8. The method of claim 1, wherein said preconfigured groups of carrier frequencies include one or more overlapping carriers.

9. The method of claim 1, further comprising:
transmitting the switch message as one of a physical downlink control channel (PDCCH) order signal and a higher-layer signal;
wherein, when the predefined signal is transmitted as a higher-layer signal, transmitting a common message to a predefined group of wireless devices.

10. The method of claim 9, further comprising:
providing, with the switch message, preconfigured pattern information that indicates to said wireless device that a current message is a request to initiate a switch to a new carrier;
wherein said switch message provides a bitmap to enable identification of selected carriers.

11. The method of claim 9, further comprising:
providing said wireless device with an ability to switch between preconfigured carrier frequency groups, which are respectively associated with a first communication service via a first standard and a second communication service via a second standard;
wherein said first standard is LTE and said second standard is WIFI.

12. The method of claim 1, further comprising:
receiving from said wireless device a request to switch to a particular preconfigured group of carrier frequencies; and
determining whether to approve said request to switch to said particular preconfigured group of carrier frequencies; and
in response to a determination to approve said request to switch is made, transmitting a corresponding switch request message to the wireless device.

13. An evolved Node B (eNodeB) comprising:
a processor;
a memory having stored therein a scheduler;
a utility which when executed by the processor, performs the functions of:
dynamically identifying a plurality of preconfigured groups of carrier frequencies for downlink communication with the wireless device;
sending, to the wireless device, at least one information signal that specifies a first pre-configured group of carrier frequencies and an alternative, second pre-configured group of carrier frequencies from among the plurality of preconfigured groups of carrier frequencies identified;
sending a request message to the wireless device to instruct the wireless device to communicate via the first pre-configured group of carrier frequencies during a first communication period;
dynamically determining whether or not to trigger a switch from the first preconfigured group of carrier frequencies to the second preconfigured group of carrier frequencies, wherein triggering a switch from the first preconfigured group of carrier frequencies to the second preconfigured group of carrier frequencies occurs when one of the following occurs: (1) one or more carrier frequencies require designation to a common group of wireless devices, (2) the wireless device generates a request to listen to or operate on one or more particular carrier frequencies, (3) a particular carrier frequency provides the wireless device with less battery consumption, and (4) the second pre-configured group of carrier frequencies provides lower cost of service than the first pre-configured group of carrier frequencies; and
in response to determining to trigger said switch, transmitting a switch message to request said wireless device to perform the switch.

14. The eNodeB of claim 13, wherein said utility further performs the functions of:
obtaining acknowledgement information from the wireless device that indicates whether the wireless device has completed the switch according to said switch message; and
receiving verification that said wireless device is receiving data via said second preconfigured group of carrier frequencies.

15. The eNodeB of claim 13, wherein said utility further performs the functions of:
providing instructions to said wireless device to restrict said wireless device from communicating via said second pre-configured group of carrier frequencies until said eNodeB transmits the signal to the wireless device to request the switch to said second pre-configured group of carrier frequencies.

16. The eNodeB of claim 13, wherein said utility further performs the functions of:
transmitting to said wireless device a first set of system parameters corresponding to a first preconfigured group of carrier frequencies prior to the request to initiate communication in said initial communication period via said first preconfigured group;
transmitting a second set of system parameters following connection of said wireless device with said eNodeB via said first pre-configured group of carrier frequencies.

17. The eNodeB of claim 16, wherein the first set of system parameters associated with said first pre-configured group is transmitted at a period that is defined by one of: (a) a higher priority, first period that is prior to transmission of said second set of system parameters; and (b) a lower priority, second period that is substantially at a same time as a transmission of said second set of system parameters.

18. The eNodeB of claim 13, wherein said utility further performs the functions of:
sending an appropriate set of system parameters to the wireless device at a period prior to transmission of a request to switch to a corresponding preconfigured group of carrier frequencies, wherein said appropriate set of system parameters are provided prior to the switch to minimize delays in subsequent switching of carrier frequencies.

19. The eNodeB of claim 13, wherein said utility further performs the functions of:
assigning one or more anchor carriers to the wireless device; and
wherein said preconfigured groups of carrier frequencies include one or more overlapping carriers.

20. The eNodeB of claim 13, wherein said utility further performs the function of:
- transmitting the switch message as one of a physical downlink control channel (PDCCH) order signal and a higher-layer signal;
- wherein, when the predefined signal is transmitted as a higher-layer signal, transmitting a common message to a predefined group of wireless devices.

21. The eNodeB of claim 20, wherein said utility further performs the function of:
- providing, with the switch message, preconfigured pattern information that indicates to said wireless device that a current message is a request to initiate a switch to a new carrier;
- wherein said switch message provides a bitmap to enable identification of selected carriers.

22. The eNodeB of claim 20, wherein said utility further performs the function of:
- providing said wireless device with an ability to switch between preconfigured carrier frequency groups, which are respectively associated with a first communication service via a first standard and a second communication service via a second standard;
- wherein said first standard is LTE and said second standard is WIFI.

23. The eNodeB of claim 13, wherein said utility further performs the function of:
- receiving from said wireless device a request to switch to a particular preconfigured group of carrier frequencies; and
- determining whether to approve said request to switch to said particular preconfigured group of carrier frequencies; and
- in response to a determination to approve said request to switch is made, transmitting a corresponding switch request message to the wireless device.

* * * * *